United States Patent
Suk

(10) Patent No.: US 9,550,470 B2
(45) Date of Patent: Jan. 24, 2017

(54) CURTAIN AIRBAG APPARATUS

(71) Applicant: HYUNDAI MOBIS Co., Ltd., Yongin-si, Gyeonggi-do (KR)

(72) Inventor: Dong Su Suk, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/881,679

(22) Filed: Oct. 13, 2015

(65) Prior Publication Data

US 2016/0107601 A1    Apr. 21, 2016

(30) Foreign Application Priority Data

Oct. 17, 2014  (KR) .................. 10-2014-0141132

(51) Int. Cl.
*B60R 21/232* (2011.01)
*B60R 21/233* (2006.01)
*B60R 21/231* (2011.01)

(52) U.S. Cl.
CPC .... *B60R 21/232* (2013.01); *B60R 2021/23107* (2013.01); *B60R 2021/23308* (2013.01)

(58) Field of Classification Search
CPC .......... B60R 21/232; B60R 21/214; B60R 21/23138; B60R 21/233; B60R 21/239; B60R 2021/2395; B60R 2021/23308
See application file for complete search history.

(56) References Cited

U.S. PATENT DOCUMENTS

| | | | | |
|---|---|---|---|---|
| 7,770,917 B2* | 8/2010 | Henderson | ............ | B60R 21/232 280/730.2 |
| 8,967,660 B2* | 3/2015 | Taguchi | ................ | B60R 21/233 280/729 |
| 9,108,588 B2* | 8/2015 | Fukawatase | .......... | B60R 21/233 |
| 2005/0184493 A1* | 8/2005 | Hofmann | .......... | B60R 21/23138 280/730.2 |
| 2009/0014989 A1* | 1/2009 | Henderson | ............ | B60R 21/232 280/730.2 |
| 2010/0013198 A1* | 1/2010 | Karlsson | ................ | B60R 21/214 280/728.2 |
| 2011/0012328 A1* | 1/2011 | Ewing | .................... | B60R 21/232 280/730.2 |
| 2011/0079990 A1* | 4/2011 | Cheal | .................... | B60R 21/213 280/730.2 |

* cited by examiner

*Primary Examiner* — Drew Brown
(74) *Attorney, Agent, or Firm* — Paratus Law Group, PLLC

(57) ABSTRACT

Provided is a curtain airbag apparatus capable of preventing a head of an occupant from being moved forward and colliding with a structure of a vehicle at the time of an oblique collision of the vehicle. To this end, a curtain airbag apparatus according to an exemplary embodiment of the present invention includes: a curtain airbag which is inflated when gas flows into the curtain airbag; and an auxiliary airbag which is coupled to the curtain airbag, and protrudes into the interior of a vehicle while being inflated when the gas flowing into the curtain airbag flows into the auxiliary airbag.

9 Claims, 4 Drawing Sheets

CURTAIN AIRBAG APPARATUS

CROSS-REFERENCE TO RELATED APPLICATIONS

The present application claims priority to Korean Patent Application Number 10-2014-0141132 filed Oct. 17, 2014, the entire contents of which the application is incorporated herein for all purposes by this reference.

TECHNICAL FIELD

The present invention relates to a curtain airbag apparatus, and more particularly, to a curtain airbag apparatus that is installed to be elongated in a front and rear direction of a vehicle.

BACKGROUND

In general, curtain airbags are installed at left and right sides of a vehicle, respectively. In more detail, the curtain airbag is installed on a side inner panel, which is disposed at an upper side of a lateral side of the vehicle, so as to be elongated in a front and rear direction of the vehicle.

The curtain airbag is deployed from the upper side to the lower side at the time of an accident of the vehicle, and disposed between a door of the vehicle and a head of an occupant to protect the head of the occupant.

FIG. 1 is a view illustrating a curtain airbag according to the related art when viewed from the top side.

Referring to FIG. 1, a driver airbag 2a is further installed in a steering wheel in the vehicle. In addition, a passenger airbag (not illustrated) for protecting an occupant seated in a front passenger seat is also installed at an upper side of a glove box disposed in front of the front passenger seat in the vehicle.

Typically, the driver airbag 2a and the passenger airbag are deployed at the time of a head-on collision of the vehicle, a curtain airbag 1a is deployed at the time of a broadside collision of the vehicle or at the time of a rollover accident of the vehicle, and the driver airbag 2a, the passenger airbag, and the curtain airbag 1a are deployed at the time of an oblique collision of the vehicle.

When the vehicle collides with an object as described above, the upper body of the occupant is bent forward by inertial force, and a head 3a of the occupant is moved forward. Particularly, at the time of an oblique collision of the vehicle, there are problems in that the head 3a of the occupant obliquely moves forward, passes between the driver airbag 2a and the curtain airbag 1a, and collides with a structure of the vehicle, or passes between the passenger airbag and the curtain airbag 1a, and collides with a structure of the vehicle.

SUMMARY

The present invention has been made in an effort to provide a curtain airbag apparatus capable of preventing a head of an occupant from being moved forward and colliding with a structure of a vehicle at the time of an oblique collision of the vehicle.

Technical problems of the present invention are not limited to the aforementioned technical problem, and other technical problems, which are not mentioned above, may be clearly understood by those skilled in the art from the following descriptions.

An exemplary embodiment of the present invention provides a curtain airbag apparatus including: a curtain airbag which is inflated when gas flows into the curtain airbag; and an auxiliary airbag which is coupled to the curtain airbag, and protrudes into the interior of a vehicle while being inflated when the gas flowing into the curtain airbag flows into the auxiliary airbag.

Other detailed matters of the exemplary embodiment are included in the detailed description and the drawings.

According to the curtain airbag apparatus according to the exemplary embodiment of the present invention, when the curtain airbag is deployed, the auxiliary airbag is inflated and protrudes into the interior of the vehicle, such that the auxiliary airbag prevents the head of the occupant from being moved forward at the time of an oblique collision of the vehicle, thereby preventing the head of the driver from colliding with a structure of the vehicle after passing between the driver airbag and the curtain airbag, and preventing the head of the passenger from colliding with a structure of the vehicle after passing between the passenger airbag and the curtain airbag.

The effect of the present invention is not limited to the aforementioned effect, and other effects, which are not mentioned above, will be clearly understood by those skilled in the art from the claims.

DETAILED DESCRIPTION

Figure 1:
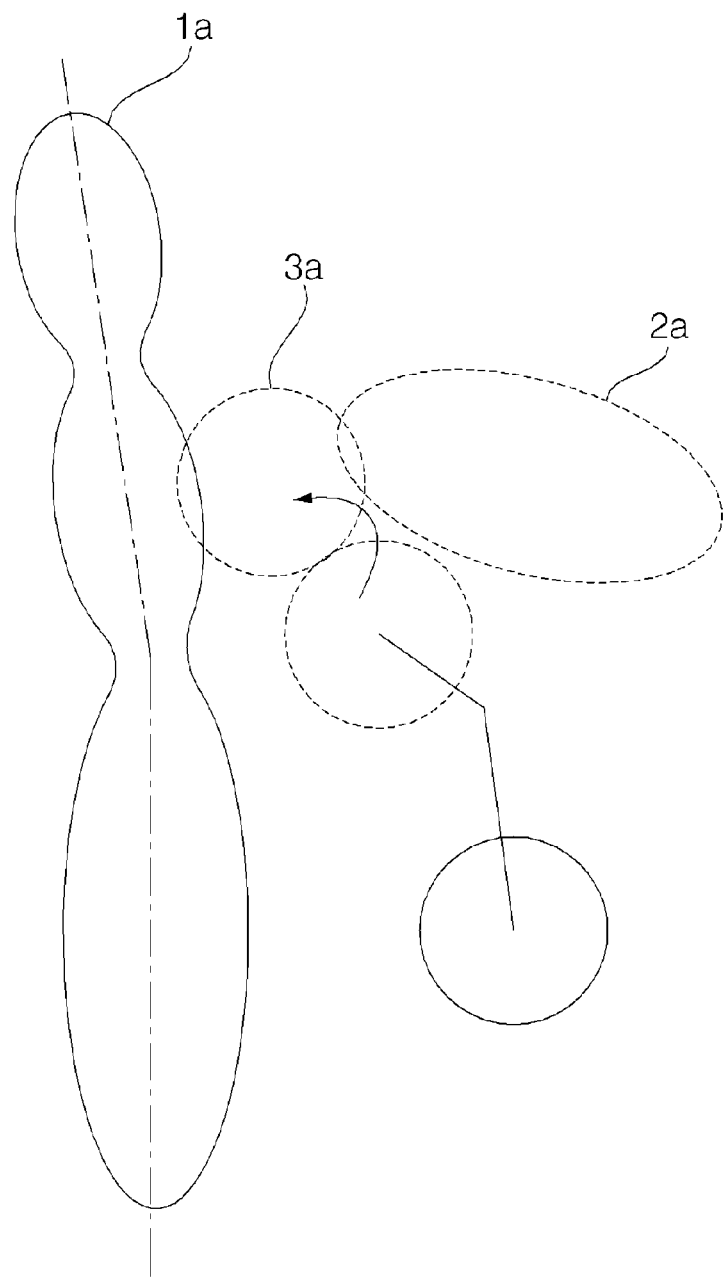
FIG. 1 is a view illustrating a curtain airbag according to the related art when viewed from the top side.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a curtain airbag apparatus according to an exemplary embodiment of the present invention will be described with reference to the drawings.

Figure 2:
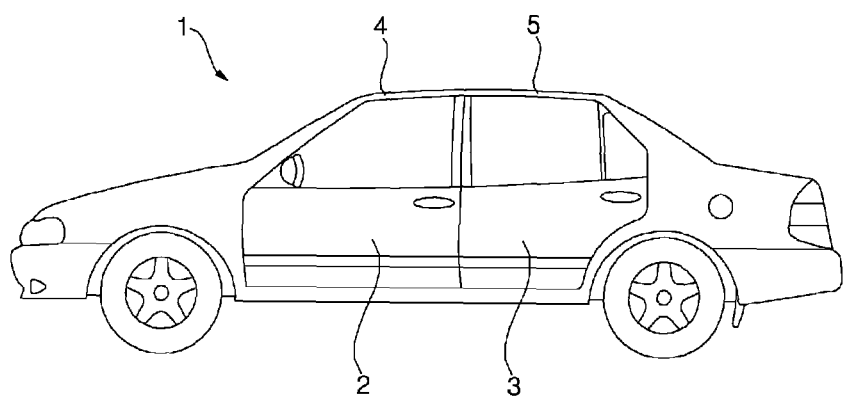
FIG. 2 is a side view illustrating a vehicle in which a curtain airbag apparatus according to an exemplary embodiment of the present invention is installed.
Figure 3:
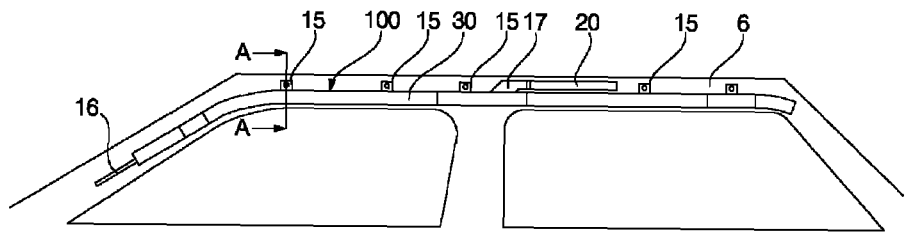
FIG. 3 is a view illustrating a state in which the curtain airbag apparatus according to the exemplary embodiment of the present invention is installed in the vehicle.
Figure 4:
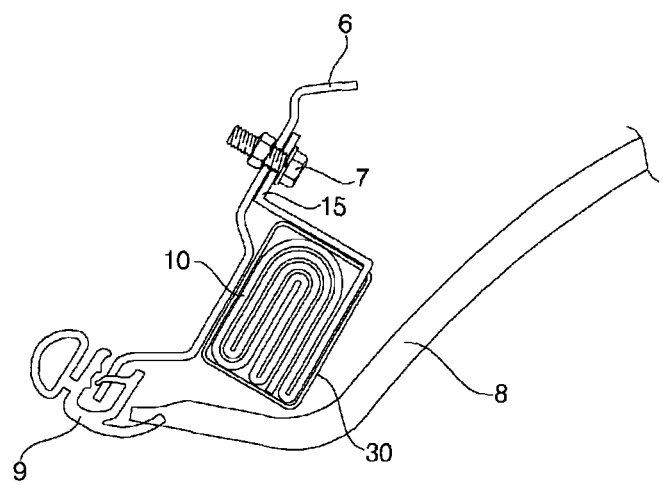
FIG. 4 is a cross-sectional view taken along line A-A of FIG. 3.
Figure 5:
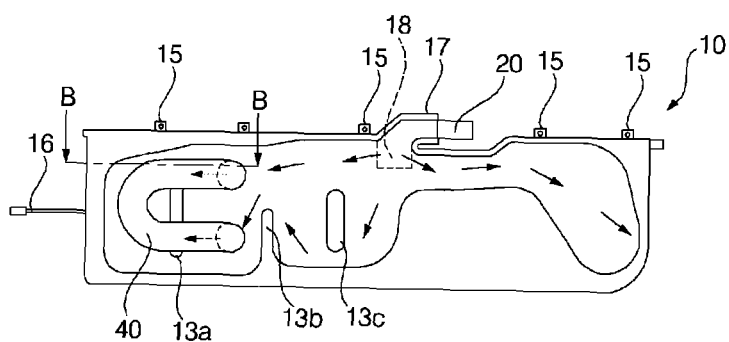
FIG. 5 is a view illustrating a state in which a curtain airbag and an auxiliary airbag of the curtain airbag apparatus according to the exemplary embodiment of the present invention are deployed.

FIG. 2 is a side view illustrating a vehicle in which the curtain airbag apparatus according to the exemplary embodiment of the present invention is installed, FIG. 3 is a view illustrating a state in which the curtain airbag apparatus according to the exemplary embodiment of the present invention is installed in the vehicle, FIG. 4 is a cross-sectional view taken along line A-A of FIG. 3, and FIG. 5 is a view illustrating a state in which a curtain airbag and an auxiliary airbag of the curtain airbag apparatus according to the exemplary embodiment of the present invention are deployed.

Referring to FIGS. 2 to 5, a curtain airbag apparatus 100 according to an exemplary embodiment of the present invention is mounted at an upper side of a vehicle 1 so as to be elongated in a front and rear direction.

A front door 2 and a rear door 3, through which occupants (including both a driver and a passenger) get in and out of the vehicle 1, are provided at a lateral side of the vehicle 1. An A-pillar 4 is disposed at an upper side of the front door 2, a C-pillar 5 is disposed at an upper side of the rear door 3, and a B-pillar (not illustrated) is disposed between the front door 2 and the rear door 3 so as to be elongated in an up and down direction.

The curtain airbag apparatus 100 is mounted on a side inner panel 6, which is disposed inside the A-pillar 4 and the C-pillar 5, so as to be elongated in the front and rear direction. Hereinafter, the side inner panel 6 will be described as a vehicle body 6.

The curtain airbag apparatus 100 includes an inflator 20 which generates gas, and a curtain airbag 10 which is connected with the inflator 20 and inflated and deployed when gas generated by the inflator 20 flows into the curtain airbag 10, to protect a head of the occupant.

The curtain airbag 10 is folded and then encapsulated in a cushion cover 30, and then is mounted on the vehicle body 6, which is disposed inside the A-pillar 4 and the C-pillar 5, by fastening members 7. A plurality of mounting tabs 15, which is mounted on the vehicle body 6 by the fastening members 7, is formed at an upper end of the curtain airbag 10.

The cushion cover 30 may be made of a flexible fabric material identical to a material of the curtain airbag 10. Holes (not illustrated) through which the mounting tabs 15 come out are formed at an upper side of the cushion cover 30, such that the mounting tabs 15 come out through the holes to the outside of the cushion cover 30, and then are mounted on the vehicle body 6 through the fastening members 7. In addition, a tear line (not illustrated), which is torn by expansive force of the curtain airbag 10, is formed at a lower side of the cushion cover 30. That is, the curtain airbag 10 may tear the tear line while being inflated, and then the curtain airbag 10 may be deployed while coming out to the outside of the cushion cover 30.

The curtain airbag apparatus 100 is covered by a head liner 8 such that the curtain airbag apparatus 100 is invisible from the interior of the vehicle. Here, the head liner 8 refers to a member that is made of a fabric material and covers a roof panel (not illustrated) of the vehicle 1 from the interior of the vehicle. The head liner 8 is caught by a weather strip 9 disposed at a lower end of the vehicle body 6, and when the curtain airbag 10 is inflated, the head liner 8 is detached and separated from the weather strip 9 by expansive force of the curtain airbag 10, and the curtain airbag 10 comes out through a gap between the weather strip 9 and the head liner 8 and then is deployed, such that the curtain airbag 10 is disposed between the head of the occupant and the front door 2 and the rear door 3, thereby protecting the head of the occupant.

An A-pillar tether 16, which is fixed to the vehicle body 6 disposed inside the A-pillar 4, is coupled to a front end of the curtain airbag 10. Therefore, a front side of the curtain airbag 10 is restricted by the A-pillar tether 16 when the curtain airbag 10 is inflated, such that the curtain airbag 10 may be deployed without being biased rearward.

Meanwhile, a gas inlet portion 17, which is coupled to the inflator 20, is formed at a center of an upper end of the curtain airbag 10. A tip portion of the inflator 20, through which gas is discharged, is disposed to be inserted into the gas inlet portion 17. The curtain airbag 10 may be inflated and deployed when gas generated by the inflator 20 flows into a chamber of the curtain airbag 10 through the gas inlet portion 17.

A diffuser pocket 18, which distributes gas discharged from the inflator 20 to a front side and a rear side of the curtain airbag 10, is coupled in the curtain airbag 10. The tip portion of the inflator 20 may be inserted into the gas inlet portion 17 and then inserted into the diffuser pocket 18.

The front side of the curtain airbag 10 based on the gas inlet portion 17 is an area that protects an occupant seated in a front seat, and the rear side of the curtain airbag 10 based on the gas inlet portion 17 is an area that protects an occupant seated in a rear seat.

Meanwhile, an auxiliary airbag 40 is coupled to one surface of the curtain airbag 10. The auxiliary airbag 40 is inflated when gas flowing into the curtain airbag 10 flows into the auxiliary airbag 40, and protrudes into the interior of the vehicle. The auxiliary airbag 40 is coupled to the front side of the curtain airbag 10 which is further forward than the gas inlet portion 17.

The auxiliary airbag 40 protrudes into the interior of the vehicle, and blocks a gap between a driver airbag and the curtain airbag 10, or blocks a gap between a passenger airbag and the curtain airbag 10. The auxiliary airbag 40 may be coupled to the curtain airbag 10 at a position corresponding to a position where the driver airbag is fully inflated or a position where the passenger airbag is fully inflated so that the auxiliary airbag 40 may block the gap between the driver airbag and the curtain airbag 10 or the gap between the passenger airbag and the curtain airbag 10.

The auxiliary airbag 40 is disposed in the front and rear direction on one surface of the curtain airbag 10, and has a rear end portion coupled to the one surface of the curtain airbag 10. Gas discharged from the inflator 20 is distributed in the front and rear direction by the diffuser pocket 18, and moved forward and rearward in the curtain airbag 10. Here, since the auxiliary airbag 40 is disposed in the front and rear direction on the one surface of the curtain airbag 10 such that the rear end portion of the auxiliary airbag 40 is coupled to the one surface of the curtain airbag 10, gas, which is moved forward in the curtain airbag 10, flows into the auxiliary airbag 40, and the auxiliary airbag 40 is inflated as gas flowing into the auxiliary airbag 40 is moved from the rear side to the front side. That is, a direction in which gas flows inside the curtain airbag 10 is identical to a direction in which gas flows inside the auxiliary airbag 40, and as a result, the auxiliary airbag 40 may be smoothly inflated without obstructing a flow of gas inside the curtain airbag 10.

Figure 6:
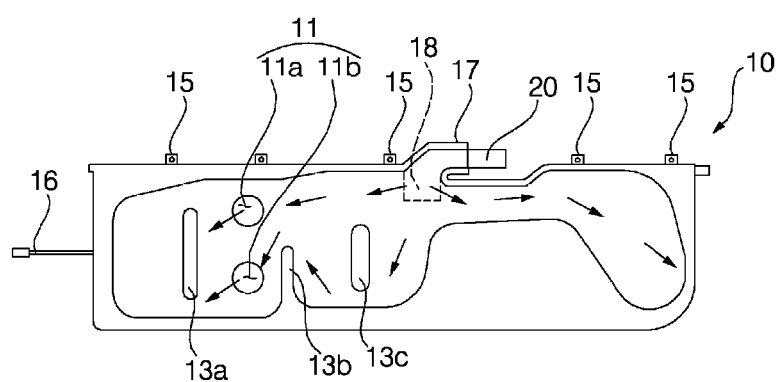
FIG. 6 is a view illustrating the curtain airbag illustrated in FIG. 5.

FIG. 6 is a view illustrating the curtain airbag illustrated in FIG. 5.

Referring to FIGS. 5 and 6, vent holes 11, which are positioned further forward than the gas inlet portion 17 and discharge gas, are formed in the one surface of the curtain airbag 10. The auxiliary airbag 40 is coupled to the one surface of the curtain airbag 10 while shielding the vent holes 11, and inflated when gas discharged through the vent holes 11 flows into the auxiliary airbag 40.

The number of vent holes 11 is more than one. In the present exemplary embodiment, two vent holes 11 are formed, and include a first vent hole 11a, and a second vent hole 11b. The first vent hole 11a and the second vent hole 11b are disposed in the up and down direction. Hereinafter, a configuration in which the first vent hole 11a is disposed at an upper side of the second vent hole 11b will be described.

The auxiliary airbag 40 has an upper end which is coupled to the curtain airbag 10 while shielding the first vent hole 11a, and a lower end which is coupled to the curtain airbag 10 while shielding the second vent hole 11b. That is, the auxiliary airbag 40 is formed in a U shape so that a portion between the upper and lower ends is opened, and the auxiliary airbag 40 is disposed in the front and rear direction on the one surface of the curtain airbag 10.

In the present exemplary embodiment, the first vent hole 11a and the second vent hole 11b are the same in size, but the first vent hole 11a may be larger in size than the second vent hole 11b, or the second vent hole 11b may be larger in size than the first vent hole 11a.

The first vent hole 11a may be formed closer to the gas inlet portion 17 than the second vent hole 11b. In this case, the upper end of the auxiliary airbag 40 is disposed closer to the gas inlet portion 17 than the lower end of the auxiliary airbag 40. In addition, the second vent hole 11b may be formed closer to the gas inlet portion 17 than the first vent hole 11a. In this case, the lower end of the auxiliary airbag 40 is disposed closer to the gas inlet portion 17 than the upper end of the auxiliary airbag 40.

A plurality of non-expandable portions 13a, 13b, and 13c is formed in the curtain airbag 10 at a position further forward than the gas inlet portion 17. The plurality of non-expandable portions 13a, 13b, and 13c is portions that are not inflated because gas does not flow into the plurality of non-expandable portions 13a, 13b, and 13c. The plurality of non-expandable portions 13a, 13b, and 13c is formed to be spaced apart from each other in the front and rear direction. That is, the plurality of non-expandable portions 13a, 13b, and 13c includes a first non-expandable portion 13a which is disposed at a foremost side, a second non-expandable portion 13b which is disposed to be spaced rearward from the first non-expandable portion 13a, and a third non-expandable portion 13c which is disposed to be spaced rearward from the second non-expandable portion 13b.

The first non-expandable portion 13a is formed to be elongated in the up and down direction, and gas flowing into the curtain airbag 10 passes through upper and lower sides of the first non-expandable portion 13a while being moved forward.

The second non-expandable portion 13b extends from a lower end of the curtain airbag 10 and protrudes upward. An upper end of the second non-expandable portion 13b is disposed to be higher than a lower end of the first non-expandable portion 13a and lower than an upper end of the first non-expandable portion 13a. Gas flowing into the curtain airbag 10 passes only through an upper side of the second non-expandable portion 13b while being moved forward.

The third non-expandable portion 13c is formed to be elongated in the up and down direction. An upper end of the third non-expandable portion 13c is disposed to be lower than the upper end of the first non-expandable portion 13a and higher than the upper end of the second non-expandable portion 13b, and a lower end of the third non-expandable portion 13c is disposed to be higher than the lower end of the first non-expandable portion 13a and lower than the upper end of the second non-expandable portion 13b. Gas flowing into the curtain airbag 10 passes through upper and lower sides of the third non-expandable portion 13c while being moved forward.

The auxiliary airbag 40 is disposed in the front and rear direction in a state in which a rear end of the auxiliary airbag 40 is coupled to the one surface of the curtain airbag 10 at a portion between the first non-expandable portion 13a and the second non-expandable portion 13b.

In the curtain airbag 10, the second non-expandable portion 13b and the third non-expandable portion 13c, which are not inflated, are formed in a section in the front and rear direction from a portion where the vent holes 11 are formed to a portion where the gas inlet portion 17 is formed. In the curtain airbag 10, only at least one of the second non-expandable portion 13b and the third non-expandable portion 13c may be formed in the section in the front and rear direction from the portion where the vent holes 11 are formed to the portion where the gas inlet portion 17 is formed.

The upper end of the second non-expandable portion 13b and the upper end of the third non-expandable portion 13c are disposed to be lower than the gas inlet portion 17. At least one vent hole 11a of the plurality of vent holes 11 is disposed to be higher than the upper end of the second non-expandable portion 13b and the upper end of the third non-expandable portions 13c. Gas, which flows forward in the curtain airbag 10 among the gases that flow in the front and rear direction through the diffuser pocket 18, may easily flow into the auxiliary airbag 40 through the vent holes 11 while being moved forward via the upper end of the second non-expandable portion 13b and the upper end of the third non-expandable portion 13c.

Figure 7:
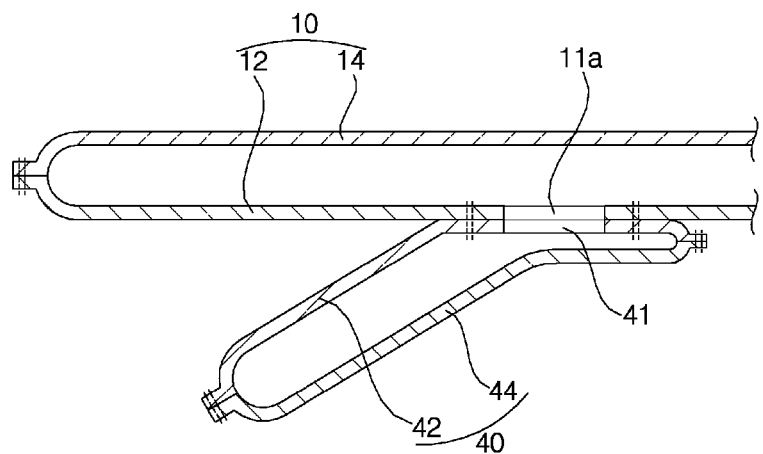
FIG. 7 is a cross-sectional view taken along line B-B of FIG. 5.

FIG. 7 is a cross-sectional view taken along line B-B of FIG. 5.

Referring to FIGS. 5 and 7, the curtain airbag 10 is manufactured by coupling two flexible panels by sewing. That is, the curtain airbag 10 includes an inner board 12, and an outer board 14 that is coupled to the inner board 12. The inner board 12 and the outer board 14 have the same size and structure. The curtain airbag 10 may be completed by spreading out the outer board 14 on a floor, spreading out the inner board 12 and stacking the inner board 12 on the outer board 14, and thereafter sewing circumferences of the inner board 12 and the outer board 14. When gas flows into the curtain airbag 10 and the curtain airbag 10 is deployed, the inner board 12 is disposed to be directed toward the interior of the vehicle, and the outer board 14 is disposed to be directed toward the front door 2 and the rear door 3. That is, the inner board 12 forms the one surface of the curtain airbag 10, and the outer board 14 forms the other surface of the curtain airbag 10.

The vent holes 11 are formed in the inner board 12 that forms the one surface of the curtain airbag 10. While FIG. 7 illustrates only the first vent hole 11a, the second vent hole 11b is also formed in the inner board 12 at a lower side of the first vent hole 11a.

A lateral surface of the rear end portion of the auxiliary airbag 40 is coupled to the inner board 12 of the curtain airbag 10. A communicating hole 41, which is in communication with the vent hole 11, is formed in the lateral surface of the rear end portion of the auxiliary airbag 40 which is coupled to the inner board 12 of the curtain airbag 10. While FIG. 7 illustrates a configuration in which the communicating hole 41 in communication with the first vent hole 11a is formed only in the lateral surface of the upper end of the auxiliary airbag 40 which is coupled while shielding the first vent hole 11a, a communicating hole 41, which is in communication with the second vent hole 11b, is also formed in a lateral surface of the lower end of the auxiliary airbag 40 which is coupled while shielding the second vent hole 11b. The reason why the communicating holes 41 are formed in the lateral surfaces of the auxiliary airbag 40 is to allow gas, which flows forward in the curtain airbag 10, to smoothly flow into the auxiliary airbag 40. That is, since the auxiliary airbag 40 is disposed in the front and rear direction in a state in which one surface of the auxiliary airbag 40 is in contact with the one surface of the curtain airbag 10, the communicating holes 41 are formed in the lateral surfaces of the auxiliary airbag 40, such that gas, which flows forward in the curtain airbag 10, may smoothly flow into the auxiliary airbag 40.

Similar to the curtain airbag 10, the auxiliary airbag 40 is manufactured by using two flexible panels. The auxiliary airbag 40 may be made of the same material as the curtain airbag 10. The auxiliary airbag 40 includes a first panel 42 which is formed with the communicating hole 41 and coupled to the curtain airbag 10 by sewing, and a second panel 44 which is coupled to the first panel 42 by sewing circumferences of the first and second panels 42 and 44.

An operation of the curtain airbag apparatus according to the exemplary embodiment of the present invention, which is configured as described above, will be described below.

First, at the time of an accident of the vehicle 1, the inflator 20 generates and discharges gas. The gas discharged from the inflator 20 flows into the diffuser pocket 18, and the diffuser pocket 18 distributes the gas flowing into the diffuser pocket 18 in the front and rear direction of the curtain airbag 10, such that the gas flowing into the curtain airbag 10 is moved in the front and rear direction.

Thereafter, a rear portion of the curtain airbag 10 is inflated by gas that is distributed by the diffuser pocket 18 and moved rearward. At the same time, a front portion of the curtain airbag 10 is also inflated by gas that is distributed by the diffuser pocket 18 and moved forward.

Gas moving forward in the curtain airbag 10 passes through the upper and lower ends of the third non-expandable portion 13c disposed to be closest to the gas inlet portion 17, and then continues to be moved forward while passing through the upper end of the second non-expandable portion 13b.

Thereafter, a part of the gas, which passes through the upper end of the second non-expandable portion 13b, is discharged to the outside of the curtain airbag 10 through the first vent hole 11a and the second vent hole 11b, and the discharged gas flows into the auxiliary airbag 40 through the communicating holes 41 formed in the auxiliary airbag 40, such that the auxiliary airbag 40 begins to be inflated from a rear side to a front side thereof. Here, gas, which moves forward from the diffuser pocket 18, may flow directly into the first vent hole 11a while passing through the upper end of the second non-expandable portion 13b and the upper end of the third non-expandable portion 13c. That is, a direction in which gas moves forward in the curtain airbag 10 is identical to a direction in which gas flows into the auxiliary airbag 40 from the rear side to the front side. Therefore, since a flow of gas in the auxiliary airbag 40 is identical to a flow gas in the curtain airbag 10, the auxiliary airbag 40 may be smoothly deployed together with the curtain airbag 10.

Meanwhile, the remaining gas of the gas passing through the upper end of the second non-expandable portion 13b flows into the front side of the curtain airbag 10 while passing through the upper and lower ends of the first non-expandable portion 13a, such that gas completely flows into the front side of the curtain airbag 10.

Since only the rear end of the auxiliary airbag 40 is coupled to the curtain airbag 10 and the auxiliary airbag 40 is disposed in the front and rear direction on the curtain airbag 10, when the auxiliary airbag 40 is inflated, a front portion of the auxiliary airbag 40 protrudes into the interior of the vehicle while being separated from the curtain airbag 10.

As described above, according to the curtain airbag apparatus 100 according to the exemplary embodiment of the present invention, when the curtain airbag 10 is deployed, the auxiliary airbag 40 is inflated and protrudes into the interior of the vehicle, such that the auxiliary airbag 40 prevents the head of the occupant from being moved forward at the time of an oblique collision of the vehicle 1, thereby preventing the head of the driver from colliding with a structure of the vehicle 1 after passing between the driver airbag and the curtain airbag 10, and preventing the head of the passenger from colliding with a structure of the vehicle 1 after passing between the passenger airbag and the curtain airbag 10.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:
1. A curtain airbag apparatus comprising:
an inflator which generates gas;
a curtain airbag which is inflated when the gas flows into the curtain airbag; and
an auxiliary airbag which is coupled to the curtain airbag, and protrudes into the interior of a vehicle while being inflated when the gas flowing into the curtain airbag flows into the auxiliary airbag,
wherein a vent hole through which gas is discharged is formed in the curtain airbag, and the auxiliary airbag is coupled to the curtain airbag while shielding the vent hole, and inflated when gas discharged through the vent hole flows into the auxiliary airbag,
wherein a gas inlet portion to which the inflator is coupled is formed in the curtain airbag, and the vent hole is formed further forward than the gas inlet portion, and
wherein at least one non-expandable portion, which is not inflated, is formed in the curtain airbag in a section in a front and rear direction from a portion where the vent hole is formed to a portion where the gas inlet portion is formed, an upper end of the at least one non-expandable portion is disposed to be lower than the gas inlet portion, the number of vent holes is more than one, and at least one vent hole is disposed to be higher than the upper end of the at least one non-expandable portion.

2. The curtain airbag apparatus of claim 1, wherein the vent hole is formed in one surface of the curtain airbag.

3. The curtain airbag apparatus of claim 2, wherein when the curtain airbag is deployed, the one surface is disposed to be directed toward the interior of the vehicle.

4. The curtain airbag apparatus of claim 1, wherein the number of vent holes is more than one, the vent holes include a first vent hole, and a second vent hole, and the auxiliary airbag has one end that is coupled to the curtain airbag while shielding the first vent hole, and the other end that is coupled to the curtain airbag while shielding the second vent hole.

5. The curtain airbag apparatus of claim 4, wherein the first vent hole and the second vent hole are disposed in an up and down direction.

6. The curtain airbag apparatus of claim 1, wherein the auxiliary airbag is coupled to be positioned further forward than the gas inlet portion.

7. The curtain airbag apparatus of claim 6, wherein the auxiliary airbag is disposed in a front and rear direction on the curtain airbag, and has a rear end portion coupled to the curtain airbag.

8. The curtain airbag apparatus of claim 1, wherein a lateral surface of a rear end portion of the auxiliary airbag is coupled to the curtain airbag, and a communicating hole, which is in communication with the vent hole, is formed in the lateral surface of the rear end portion.

9. The curtain airbag apparatus of claim 8, wherein the auxiliary airbag includes:
   a first panel which is formed with the communicating hole and coupled to the curtain airbag; and
   a second panel which is coupled to the first panel.

* * * * *